Patented Sept. 21, 1948

2,449,684

UNITED STATES PATENT OFFICE 2,449,684

AQUEOUS POLYVINYL CHLORIDE/POLY-STYRENE DISPERSIONS

Reginald George Robert Bacon, Harold Taylor, and Leonard Wood, Blackley, Manchester, England, assignors to Imperial Chemical Industries Limited, a corporation of Great Britain No Drawing. Application February 12, 1945, Serial No. 577,584. In Great Britain January 12, 1944

1 Claim. (Cl. 260—29.6)

This invention relates to polymer dispersions and more particularly it relates to polymer dispersions comprising both polyvinyl chloride and polystyrene and suitable for use as dipping compositions and to articles fashioned therefrom.

Shaped hollow articles such as finger stalls and surgical gloves may be fashioned by immersion of a suitably shape former in natural rubber latex, withdrawing the former and allowing the latex film so deposited on the outside of the former to dry, the process being repeated a sufficient number of times successively until by deposition of a number of layers upon the former a film of the required degree of thickness is produced. However for many purposes such articles fashioned in this manner from natural rubber are not wholly satisfactory especially in uses where organic solvents and other chemical reagents come into contact with the said articles frequently producing swelling and other undesirable deterioration. Such articles made from natural rubber are moreover not of high durability owing to the rapidly deleterious effects of air and sunlight upon natural rubber.

It has been proposed to use dispersions of polyvinyl chloride containing plasticisers in the production of films, coatings, lacquers and varnishes and this material by reason of its high resistance to swelling by organic solvents, to attack by many chemical reagents and its high durability when exposed to air and sunlight has many advantages.

However polyvinyl chloride dispersions containing plasticisers have hitherto not proved wholly satisfactory for the production of articles by the dipping process because it is found that when the film of polymer dispersion is allowed to dry it is very difficult even by drying at an inconveniently high temperature to obtain films which are unbroken and free from pin-holes and cracks. This difficulty is further accentuated when the polymer dispersions contain a thickening agent as is advantageously the case when thick films are required.

We have found that these disadvantages are overcome by the use of dispersions containing besides polyvinyl chloride and plasticiser, certain proportions of polystyrene.

According to our invention we provide aqueous polymer dispersions suitable for use in the production of articles by dipping which comprise polyvinyl chloride, from 10 to 100 parts by weight of polystyrene per 100 parts by weight of polyvinyl chloride, and a plasticiser.

The dispersions of our invention may be made by mixing a dispersion of polyvinyl chloride with a dispersion of polystyrene which separately may be made by known processes. Thus a dispersion of polyvinyl chloride may be made for example by the processes described in British specifications Nos. 410,132 and 494,772 and in the specification of application No. 7,063/41 and a dispersion of polystyrene may be made for example by the process described in the specification of application No. 16,851/42. The plasticiser may be incorporated either with the polyvinyl chloride dispersion or the polystyrene dispersion separately or it may be incorporated with both dispersions separately. Or again it may be incorporated with the combined dispersions after mixing. If the plasticiser is incorporated with either or both dispersions separately it may be present already during the polymerisation process or it may be incorporated in the dispersions after the polymerisation process. If the plasticiser is incorporated with the polyvinyl chloride dispersion after the polymerisation process, the incorporation may advantageously be effected by the process described in the specification of our copending application No. 571,122, filed Jan. 2, 1945. Similarly, if the plasticiser is incorporated with the mixed dispersion the incorporation may be effected in a manner similar to that described in the specification of our aforesaid copending application for the incorporation of plasticisers into polyvinyl chloride dispersions.

The polystyrene dispersion is, as already said, mixed with the polyvinyl chloride dispersion in such quantity as to produce a mixed dispersion in which for every 100 parts by weight of polyvinyl chloride there are present from 10 to 100 parts by weight of polystyrene. If the proportion of polystyrene is less than 10 parts per 100 parts of polyvinyl chloride the films obtained from the dispersions tend to develop cracks and pin-holes during drying such as are commonly obtained using dispersions containing only polyvinyl chloride and plasticiser and if the proportion of polystyrene exceeds that mentioned above the elastic, rubber-like properties of the films obtained from the dispersion are harmfully affected, and the films are less strong and less clear.

The polystyrene dispersions which are used in making the dispersions of the invention may contain polystyrene of widely varying molecular weight. Thus polystyrene dispersions in which the polystyrene has an average molecular weight varying from 20,000 to 120,000, as estimated by viscosity measurements, have been used successfully.

The plasticisers which are used in the dispersions of the invention may be liquids of high boiling point which are compatible with the mixture of polyvinyl chloride and polystyrene. Examples of suitable plasticisers include di-n-propyl phthalate, di-n-butyl phthalate, triphenyl phosphate and tricresyl phosphate. The proportion of plasticiser may be varied considerably and the proportion most suitable depends on the nature of the plasticiser and on the relative proportions of polyvinyl chloride and polystyrene in the mixed dispersion to be used. Generally speaking the higher the proportion of polystyrene in the mixture the lower the proportion of plasticiser which is necessary.

To the dispersions of the invention there may be added if desired also thickening agents. These substances are commonly added to dipping compositions when it is desired to obtain thicker films at a single immersion of the former. Suitable thickening agents are for example proteins, salts of alginic acid, natural gums and resins and alkali metal salts of polyacrylic acid. The proportion of thickening agent added may be varied according to the particular agent being used, according to the particular dispersion being used and according to the result desired. Generally proportions between 0.1 and 5 parts per 100 parts of non-aqueous material in the dispersion are suitable.

The dispersions of the invention are, as said, especially suitable for the production of hollow shaped articles by a dipping process. In order to produce such shaped articles a former, which may be made for example of glass or porcelain, is immersed in the dispersion and withdrawn therefrom. The coating of dispersion on the former may then be allowed to dry at atmospheric temperature or it may, if desired, be dried at a higher temperature provided it is below 100° C.; it is then submitted to a heat treatment at a temperature above 100° C., for example from 110°–150° C., for a short period, for example from 5 to 30 minutes, whereby the weak coating left after drying is converted into a strong, rubber-like coating. The coating is then removed from the former.

If desired however the former may be coated successively with a series of coats, drying between each coating, so as to build up a thick multiple coating, before finally the coated former is submitted to heat treatment at a temperature above 100° C. The dispersions of the invention are particularly advantageous when used in such a process for it is in the formation of multilayer films of this kind that many dispersions which give satisfactorily continuous single layer films show a tendency to give cracked films in the later coatings.

The invention is illustrated but not limited by the following examples in which parts are by weight.

*Example 1*

904 parts of an aqueous dispersion, containing 270 parts of polyvinyl chloride and 6 parts of the sodium salt of sulphonated oleic acid, are mixed with 148 parts of an aqueous dispersion containing 30 parts of polystyrene of molecular weight 62,000 and 1 part of the sodium salt of sulphonated oleic acid, and with 148 parts of water, and the mixture is placed in an enclosed vessel. The mixed dispersion is stirred and to it are added 30 parts of an aqueous paste, containing 9 parts of the sodium salt of sulphated sperm oil alcohol, and 300 parts of dibutyl phthalate. The mixture is heated to 70° C. and maintained at that temperature, with continued stirring, during 18 hours. When cool 11 parts of coagulated material are separated by straining the product through cloth. The mobile white dispersion thus obtained contains polyvinyl chloride, polystyrene and dibutyl phthalate in the proportions 45:5:50. 400 parts of it are added, with stirring, to 34 parts of an aqueous syrup containing 3.8 parts of ammonium polymethacrylate. The resulting mixture is a white liquid of cream-like consistency.

This mixture is placed in a vessel of sufficient depth to accommodate the formers, covered in order to prevent evaporation, and allowed to stand overnight in order that occluded air-bubbles may rise to the surface and be discharged. It is then carefully stirred without the introduction of further air bubbles and into the dispersion the formers are immersed and thereafter withdrawn mechanically at a steady speed. The coating of dispersion upon the formers is then allowed to dry at 20–25° C. and when dry is heated at 120° C. during 30 minutes. A film is obtained, free from pin-holes and cracks, which is strong and rubber-like in elasticity. The operation is repeated with further immersion of the former after the drying process and so formers coated with 2, 3 and 4 layers are obtained. In every case the layer, both before and after heating, is free from pin-holes and cracks.

By contrast when a similar dispersion is made from which polystyrene is omitted the deposits formed on the former by this process crack when dried.

*Example 2*

109 parts of an aqueous dispersion containing 22.8 parts of polyvinyl chloride plasticised with 22.8 parts of dibutyl phthalate, and containing also 0.7 part of the sodium salts of castor oil fatty acids, 0.4 part of sodium stearate and 0.4 part of the sodium salt of sulphonated oleic acid, are mixed at 20° C. with 19 parts of an aqueous dispersion containing 4.5 parts of polystyrene and 0.1 part of the sodium salt of sulphonated oleic acid. The resulting mixture, a white mobile fluid, contains polyvinyl chloride, polystyrene and dibutyl phthalate in the proportions 45.5/9/45.5. It is thickened to a cream-like consistency by adding it gradually, with constant stirring, to 2.6 parts of an aqueous syrup containing 0.35 part of ammonium polymethacrylate.

When used for the coating of formers as described in Example 1 this dispersion gives continuous films, free from pin-holes and cracks and of high strength and elasticity.

We claim:

Aqueous polymer dispersions suitable for use in the production of articles by dipping which comprise, in aqueous dispersion, polyvinyl chloride, from 10 to 100 parts by weight of polystyrene of molecular weight from 20,000 to 120,000 per 100 parts by weight of polyvinyl chloride, and a plasticiser compatible with said polymer mixture.

REGINALD GEORGE ROBERT BACON.
HAROLD TAYLOR.
LEONARD WOOD.

REFERENCES CITED

The following references are of record in the file of this patent:

UNITED STATES PATENTS

| Number | Name | Date |
|---|---|---|
| 2,188,396 | Semon | Jan. 30, 1940 |
| 2,230,000 | Hauffe et al. | Jan. 28, 1941 |

OTHER REFERENCES

The Industrial Chemist, article by Renfrew, pages 197–198, April, 1943.